3,373,194
POLY(N-ACYLETHYLENIMINES) FROM
2-SUBSTITUTED-2-OXAZOLINES
Robert Fuhrmann, Morris Plains, Emery C. Lazar, Morristown, and Jan F. Van Peppen, Chester, N.J., assignors to Allied Chemical Corporation, New York, N.Y., a corporation of New York
No Drawing. Filed July 26, 1965, Ser. No. 474,994
6 Claims. (Cl. 260—559)

ABSTRACT OF THE DISCLOSURE

This invention relates to novel polyethylenimines having etheric acyl group side chains attached to the nitrogen atoms of the backbone chain. These polymers are prepared by the polymerization of 2-oxazolines having ether-containing substituents on the 2-position.

---

Heretofore, a number of polyamides such as 6-6 nylon and 6-nylon have been modified by attaching ether group side chains to a portion of the nitrogen atoms. For instance, the reaction of 6-6 nylon with a solution containing formaldehyde and methanol gives a partially N-methoxymethylated product. Such ether polyamides contain the acyl groups in the backbone chains.

The polymers of the present invention are composed of recurring units of the formula

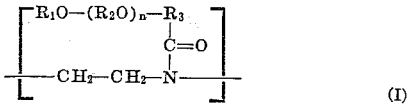

(I)

wherein $R_1$ is a member selected from the group consisting of monovalent hydrocarbon and halogenated hydrocarbon radicals; $R_2$ and $R_3$ are members selected from the group consisting of divalent hydrocarbon and halogenated hydrocarbon radicals having the divalency on a single carbon atom or on different carbon atoms; and $n$ is an integer from 0 to 3. Preferably $R_1$ represents an alkyl radical containing 1 to 12 carbon atoms, an aryl radical containing 6 to 10 carbon atoms, an aralkyl radical containing 7 to 16 carbon atoms, and the chlorinated and fluorinated derivatives of these radicals; and $R_2$ and $R_3$ represent alkylene or alkylidene radicals containing 1 to 10 carbon atoms, divalent aromatic hydrocarbon radicals containing 6 to 10 carbon atoms, divalent aralkyl radicals containing 7 to 16 carbon atoms, and the chlorinated and fluorinated derivatives of these radicals. Specific examples of suitable $R_1$ groups are methyl, ethyl, isobutyl, pentyl, heptyl, dodecyl, phenyl, naphthyl, tolyl, benzyl, chloromethyl, fluoroethyl, and p-chlorphenyl. Specific examples of suitable $R_2$ and $R_3$ groups include methylene, ethylene, tetramethylene, butylidene, o-, m-, and p-phenylene, tolylene $(C_6H_4CH_2CH_2)$, chloroethylene, fluoroethylene, and chlorophenylene.

The polymers of this invention are prepared by the polymerization of heterocyclic monomers of the formula

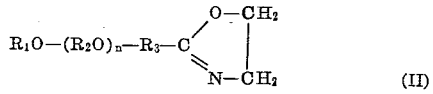

(II)

wherein $R_1$, $R_2$, $R_3$ and $n$ have the meanings given above. These monomers are 2-substituted-2-oxazolines, wherein the 2-substituent is an ether-containing radical. By polymerization of such monomers, polymers are obtained having an ether-containing side chain on each and every nitrogen in the backbone.

The polymerization is conducted in the presence of a catalyst which can be an alkyl halide, a boron-fluorine compound, an antimony fluorine compound, a strong acid, a salt of a strong acid with an oxazoline or an oxazine, an ester of a strong acid, a strongly acidic ion exchange resin or an acid-activated clay. Illustrative of catalysts which can be employed are methyl iodide; 1,4-dibromobutane; boron trifluoride etherate; antimony pentafluoride; p-toluene sulfonic acid; dimethyl sulfate; sulfuric acid; nitric acid; perchloric acid; hydrobromic acid; hydroiodic acid; methyl sulfate; methyl p-toluene sulfonate; salts of 2-phenyl-2-oxazines, with perchloric acid, hydroiodic acid and toluene sulfonic acid and the perchlorate salt of 2-(p-chlorophenyl)-2-oxazoline. The temperature at which the polymerization is carried out may range from about 75° to 250° C. with a preferable temperature range being from about 100° to 200° C. The time required to polymerize the monomer may vary from several minutes to several days depending on the reactants, temperature, the particular monomer used, the catalyst employed, and the desired molecular weight. In general it is preferred to employ a mol ratio of about 10 to 60,000 mols of monomer per mol of catalyst.

The monomers used in this invention can be prepared by the cyclodehydration of compounds of the formula

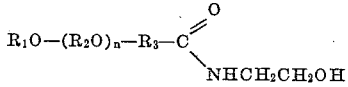

wherein $R_1$, $R_2$, $R_3$ and $n$ have the meanings given above. This cyclodehydration can be accomplished by passing vapors of this compound over a silica- or alumina-containing catalyst in accordance with the procedure set forth in copending application Ser. No. 382,342 filed July 13, 1964, or in accordance with known procedures. The monomers can also be obtained by the cyclodehydrohalogenation of compounds of the formula

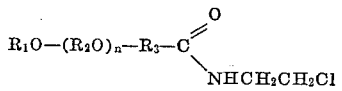

wherein $R_1$, $R_2$, $R_3$ and $n$ have the meanings given above. An article by Wiley et al. in Chemical Reviews, vol. 44, pages 447–475, describes a number of methods of preparing 2-substituted-2-oxazolines, including cyclodehydrohalogenation with sodium hydroxide and cyclodehydration with sulfuric acid, both of which are suitable for making monomers useful in the invention.

In carrying out the polymerization, a single monomer can be used to produce a homopolymer, or two or more different monomers within the scope of Formula II can be used to produce a copolymer. Additionally, a modification of the polymer defined in Formula I, in which some nitrogens do not have ether substituents, can be obtained if the monomer defined in Formula II is copolymerized preferably in a molar ratio between 1:10 and 10:1, with one or more monomers of the formula

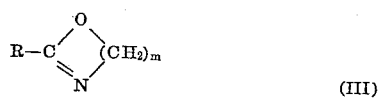

(III)

wherein R is a member selected from the group consisting of a hydrocarbon radical and a halogenated hydrocarbon radical, and $m$ is an integer of from 2 to 3. The addition of monomers having ether-containing side chains to polymeric systems comprising monomers of Formula III results in the formation of amorphous polymer rather than a crystalline one.

The polymers of the present invention in which the side chains are aliphatic ethers or polyethers are water soluble. These polymers can be used as adhesives and thickening agents in water soluble paints and aerosol sprays. Those polymers of Formula I which have an aromatic group in the side chain are generally insoluble in water. When these polymers are of a low molecular weight, they are useful as high melting waxes, while the higher molecular weight polymers can be molded, drawn into fibers and formed into films.

The following examples are given to further illustrate the invention but it is to be understood that the invention is not to be limited in any way by the details described therein.

Example 1

The catalyst used in this example was an alcoholic solution of the perchlorate salt of 2-(p-chlorophenyl)-2-oxazoline. This catalyst was prepared by adding 14.2 grams of perchloric acid to a solution of 18.15 grams of 2-(p-chlorophenyl)-2-oxazoline and 100 milliliters of absolute methanol while cooling the reaction flask in an ice bath. The perchlorate salt which was thereby produced precipitated and was recovered by filtration. The product was then dissolved in sufficient methanol to give a 1% solution of perchlorate salt.

The monomer employed was 2-(p-methoxyphenyl)-2-oxazoline which was prepared by reacting methyl anisate with ethanolamine to form N-(β-hydroxyethyl)-anisamide and then cyclidehydrating this amide with sulfuric acid.

0.154 milliliter of the above catalyst solution was added to a glass ampule and the methanol was evaporated by maintaining the ampule under a vacuum of 1 mm. for 1 hour at room temperature. 10 grams of 2-(p-methoxyphenyl)-2-oxazoline were added to the ampule, giving a monomer to catalyst mol ratio of approximately 10,000:1. The ampule was flushed with nitrogen, pumped out to a pressure of about 0.1 mm. of Hg and then sealed. The ampule was heated for 24 hours at 160° C. and then cooled to room temperature. The polymeric product formed in the ampule was removed and extracted with acetone to separate any unreacted monomer. After drying, there were obtained 8.869 grams of a yellow polymer composed of recurring units of the formula

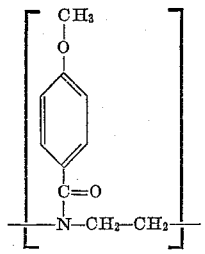

The polymer had a specific viscosity of 7.0 in a 0.52% solution in meta-cresol; a melting point of 230° C. as measured by differential thermal analysis, and a decomposition temperature of 387° C. in a nitrogen atmosphere.

Example 2

N-(β-hydroxyethyl)-ethoxy-acetamide was prepared by reacting ethanolamine with ethoxy-acetic acid. 346 grams of this amide were converted to N-(β-chloroethyl)-ethoxy-acetamide by reaction with 310 grams of thionyl chloride for one hour at 10°–20° C. using 400 milliliters of ethyl ether as a diluent. At this point, 265 grams of anhydrous sodium carbonate were added and the reaction was subjected to vacuum distillation. The ether and the unreacted thionyl chloride distilled over first followed by 2-ethoxymethyl-2-oxazoline. The 2-ethoxymethyl-2-oxazoline was purified by redistillation under vacuum to give 198.5 grams of product having a boiling point of 72° C./12 mm. Hg.

12.2 milligrams of the perchlorate salt of 2-(p-chlorophenyl)-2-oxazoline and 5 grams of 2-ethoxymethyl-2-oxazoline, a monomer to catalyst mol ratio of 890.1, were added to a glass ampule and sealed therein under vacuum. The ampule was heated at 160° C. for 24 hours and then cooled to room temperature. A polymer was obtained which was composed of recurring units of the formula

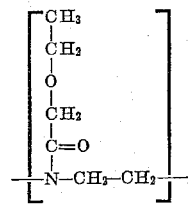

The polymer had a specific viscosity of 0.51 in a 0.52% solution in meta-cresol and a decomposition temperature of 380° C. by differential thermal analysis in a nitrogen atmosphere.

Example 3

Into a flask equipped with a reflux condenser and containing 1220 grams of methyl Cellosolve were added 92 grams of sodium, the reaction mixture being maintained at a temperature below 85° C. by an ice bath. After the sodium had disappeared, 434 grams of methyl chloroacetate were added over a 2½-hour period with the temperature being maintained at 60° to 80° C. by an ice bath. The reaction mixture was then heated at 95° C. for 1½ hours. After cooling, the resulting product was fractionally distilled and an ester of the formula

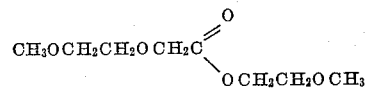

was obtained. 483.5 grams of this ester were mixed with 461 grams of ethanolamine and maintained at 158° C. for 3 hours. By fractional distillation there were recovered from the resulting reaction product 414.5 grams of a hydroxyamide of the formula

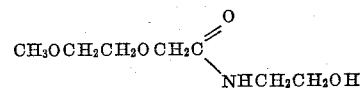

248 grams of the above hydroxyamide and 300 ccs. of ethyl ether were placed in a reaction flask equipped with a reflux condenser and 183 grams of thionyl chloride were added dropwise over a one-hour period while maintaining the temperature between —5° and 0° C. and employing a nitrogen atmosphere. After stirring the reaction mixture for an additional 4 hours at a temperature of about 0° C., 159 grams of anhydrous sodium carbonate were added. By fractional distillation of the resulting product, there were obtained 181 grams of 2-substituted-2-oxazoline of the formula

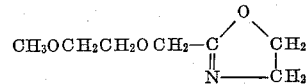

In a manner similar to that described in Example 1, 5 grams of this oxazoline were sealed under vacuum with a sufficient amount of the perchlorate salt of 2-(p-chlorophenyl)-2-oxazoline to give a monomer to catalyst mol ratio of 1000:1. The ampule was heated at 160° C. for 22 hours. A polymer of the formula

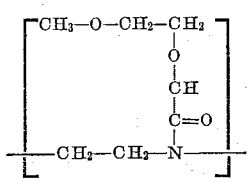

was recovered from the ampule. This polymer had a specific viscosity of 1.4 in a 0.052% solution in meta-cresol and was soluble in cold water. It exhibited marked adhesive properties, and gave a good bond between steel and aluminum plates.

Example 4

An equimolar mixture of 2-heptyl-2-oxazoline and 2-ethoxymethylene-2-oxazoline were admixed in a glass ampule with the perchlorate salt of 2-(p-chlorophenyl)-2-oxazoline in an amount sufficient to give a monomer to catalyst mol ratio of 1000:1. The ampule was heated at 160° C. for 22 hours giving an amorphous copolymer which exhibited excellent adhesion to glass.

As a comparison, it was determined that a copolymer of 2-heptyl-2-oxazoline and 2-cyclohexane-2-oxazoline produced in a similar manner was crystalline.

It will be apparent that many modifications and variations may be effected without departing from the scope of the novel concepts of the present invention and the illustrative details disclosed are not to be construed as imposing undue limitations on the invention.

We claim:

1. A polymer comprising recurring units of the formula

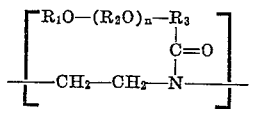

where $R_1$ is a member selected from the group consisting of an alkyl radical containing 1 to 12 carbon atoms, an aryl radical containing 6 to 10 carbon atoms and an aralkyl radical containing 7 to 16 carbon atoms; $R_2$ and $R_3$ are members selected from the group consisting of alkylene and alkylidene radicals of 1 to 10 carbon atoms, divalent aromatic hydrocarbon radicals of 6 to 10 carbon atoms and divalent aralkyl radicals of 7 to 16 carbon atoms; and $n$ is an integer of from 0 to 3.

2. A polymer composed of recurring units of the formula

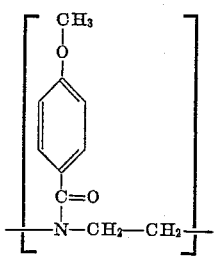

3. A polymer composed of recurring units of the formula

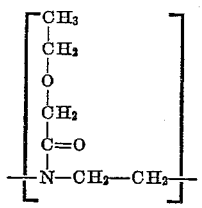

4. A polymer composed of recurring units of the formula

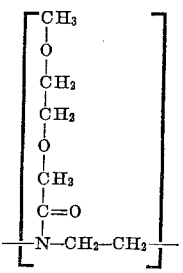

5. A copolymer comprising recurring units A having the formula

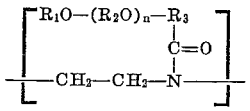

wherein $R_1$ is a member selected from the group consisting of an alkyl radical containing 1–12 carbon atoms, an aryl radical containing 6–10 carbon atoms and an aralkyl radical containing 7–16 carbon atoms; $R_2$ and $R_3$ are members selected from the group consisting of alkylene and alkylidene radicals of 1–10 carbon atoms, divalent aromatic hydrocarbon radicals of 6–10 carbon atoms, and divalent aralkyl radicals of 7–16 carbon atoms; and $n$ is an integer of from 0–3; and recurring units B having the formula

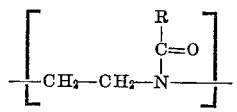

wherein R is an alkyl radical containing 1–12 carbon atoms, the molar ratio of said units A to said units B being between 1:10 and 10:1.

6. A copolymer comprising recurring units A having the formula

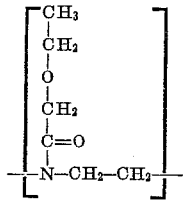

and recurring units B having the formula

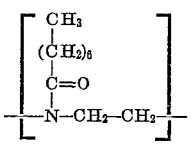

the molar ratio of said units A to said units B being between 1:10 and 10:1.

References Cited

UNITED STATES PATENTS

| | | | |
|---|---|---|---|
| 3,198,754 | 8/1965 | Ahlbrecht et al. | 260—2 |
| 3,271,430 | 9/1966 | Teumac | 260—404.5 |

WILLIAM H. SHORT, *Primary Examiner.*

M. GOLDSTEIN, *Assistant Examiner.*